US011302003B2

(12) United States Patent
Liu et al.

(10) Patent No.: US 11,302,003 B2
(45) Date of Patent: Apr. 12, 2022

(54) DEEP LEARNING BASED DATA-DRIVEN APPROACH FOR ATTENUATION CORRECTION OF PET DATA

(71) Applicant: Wisconsin Alumni Research Foundation, Madison, WI (US)

(72) Inventors: Fang Liu, Madison, WI (US);
Hyungseok Jang, Madison, WI (US);
Richard Kijowski, Verona, WI (US);
Tyler Bradshaw, Madison, WI (US);
Alan McMillan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 30 days.

(21) Appl. No.: 15/795,219

(22) Filed: Oct. 26, 2017

(65) Prior Publication Data
US 2019/0130569 A1  May 2, 2019

(51) Int. Cl.
*G06T 11/00* (2006.01)
*G06T 5/00* (2006.01)
*G06T 7/00* (2017.01)
*G06T 5/50* (2006.01)

(52) U.S. Cl.
CPC .............. *G06T 7/0014* (2013.01); *G06T 5/001* (2013.01); *G06T 5/50* (2013.01); *G06T 11/008* (2013.01); *G06T 2207/10104* (2013.01); *G06T 2207/10124* (2013.01); *G06T 2207/30004* (2013.01)

(58) Field of Classification Search
CPC ......... G06T 7/0014; G06T 5/50; G06T 5/001; G06T 2207/30004; G06T 2207/10104; G06T 2207/10124
See application file for complete search history.

(56) References Cited

U.S. PATENT DOCUMENTS

| | | | |
|---|---|---|---|
| 2003/0161521 A1* | 8/2003 | Newport | G06T 11/005 382/131 |
| 2007/0131858 A1* | 6/2007 | Wollenweber | A61B 6/037 250/252.1 |
| 2011/0007958 A1* | 1/2011 | Salomon | G06T 7/149 382/131 |
| 2012/0019548 A1* | 1/2012 | Zhu | G06T 15/503 345/589 |
| 2013/0156286 A1* | 6/2013 | Holmes | G06T 7/0012 382/133 |
| 2013/0281825 A1* | 10/2013 | Thiruvenkadam | A61B 6/5247 600/411 |

(Continued)

OTHER PUBLICATIONS

Abadi, et al., TensorFlow: Large-Scale Machine Learning on Heterogeneous Distributed Systems, Nov. 2-4, 2016, Savannah, GA, USA, pp. 1-21.

(Continued)

*Primary Examiner* — John W Lee
(74) *Attorney, Agent, or Firm* — Quarles & Brady LLP (57) ABSTRACT

The present disclosure includes systems and methods for creating positron emission tomography (PET) images. The method includes receiving at least one PET image of a subject created from PET data acquired from the subject, creating an attenuation correction map using the at least one PET image, and reconstructing PET data using the attenuation correction map and the at least one PET image to generate an attenuation corrected PET image.

20 Claims, 9 Drawing Sheets

(56) References Cited

U.S. PATENT DOCUMENTS

| | | | |
|---|---|---|---|
| 2014/0328532 A1* | 11/2014 | Sun | G06T 5/005 |
| | | | 382/131 |
| 2015/0221104 A1* | 8/2015 | Ra | G06T 11/005 |
| | | | 382/131 |
| 2016/0066874 A1 | 3/2016 | Huang | |
| 2017/0061629 A1* | 3/2017 | Zhu | G06K 9/00 |

OTHER PUBLICATIONS

Arabi, et al., Atlas-guided generation of pseudo-CT images for MRI-only and hybrid PET-MRI-guided radiotherapy treatment planning, Phys. Med. Biol. 61 (2016) 6531-6552.

Berker, et al., Attenuation correction in emission tomography using the emission data—A review, Med. Phys. 43 (2), Feb. 2016, pp. 807-832.

Greenspan, et al., Guest Editorial Deep Learning in Medical Imaging: Overview and Future Promise of an Exciting New Technique. IEEE Trans Med Imaging. 35(5):1153-1159, 2016.

He, et al., Delving Deep into Rectifiers: Surpassing Human-Level Performance on ImageNet Classification. ArXiv e-prints. 2015, pp. 1026-1034.

He, Kaiming, et al. "Identity Mappings in Deep Residual Networks." arXiv preprint arXiv:1603.05027 (2016).

Ioffe, et al., Batch Normalization: Accelerating Deep Network Training by Reducing Internal Covariate Shift. ArXiv e-prints. 2015, pp. 1-11.

Kingma, et al., Adam: a Method for Stochastic Optimization, 2015, pp. 1-15, Conference Paper ICLR.

Ladefoged, et al., A multi-centre evaluation of eleven clinically feasible brain PET/MRI attenuation correction techniques using a large cohort of patients, NeuroImage 147 (2017) 346-359.

Lau, Jeffrey MC, et al. "Evaluation of attenuation correction in cardiac PET using PET/MR." Journal of Nuclear Cardiology 24.3 (2017): 839-846.

Liu, Fang, et al. "Deep learning MR imaging-based attenuation correction for PET/MR imaging." Radiology 286.2 (2017): 676-684.

Mehranian, et al., Impact of time-of-flight PET on quantification errors in MRI-based attenuation correction, (2015). JNM., pp. 1-25.

Nair, et al., Rectified Linear Units Improve Restricted Boltzmann Machines. Proc. 27th Int. Conf. Mach. Learn. 2010. p. 807-814.

Samarin, Andrei, et al. "PET/MR imaging of bone lesions—implications for PET quantification from imperfect attenuation correction." European journal of nuclear medicine and molecular imaging 39.7 (2012): 1154-1160.

Schäfer, Jürgen F., et al. "Simultaneous whole-body PET/MR imaging in comparison to PET/CT in pediatric oncology: initial results." Radiology 273.1 (2014): 220-231.

Simonyan, et al., Very Deep Convolutional Networks for Large-Scale Image Recognition. arXiv Prepr. 2014;1-10.

Vontobel, Jan, et al. "MR-based attenuation correction for cardiac FDG PET on a hybrid PET/MRI scanner: comparison with standard CT attenuation correction." European journal of nuclear medicine and molecular imaging 42.10 (2015): 1574-1580.

Yang, Jaewon, et al. "Impact of atlas-CT-based bone anatomy compensation on MR-based attenuation correction for brain PET imaging in a time-of-flight PET/MRI system: A direct comparison to a patient-CT-based approach." EJNMMI physics. vol. 2. No. S1. Springer International Publishing, 2015.

\* cited by examiner

DEEP LEARNING BASED DATA-DRIVEN APPROACH FOR ATTENUATION CORRECTION OF PET DATA

STATEMENT REGARDING FEDERALLY SPONSORED RESEARCH

This invention was made with government support under AR068373 awarded by the National Institutes of Health. The government has certain rights in the invention.

CROSS-REFERENCE TO RELATED APPLICATIONS

Not Applicable

BACKGROUND

The field of the disclosure relates to systems and methods for positron emission tomography. More particularly, the present disclosure relates to systems and methods for attenuation correction of data acquired with positron emission tomography.

Positron emission tomography (PET) is a non-invasive imaging modality that provides direct imaging of molecular processes through the use of radiolabeled molecules, such as $^{18}$F-fluorodeoxyglucose (FDG) for glucose metabolism. PET activity is observed by detecting pairs of coincident gamma rays emitted from the PET tracer, sorted into sinograms, and reconstructed into a volumetric image. Knowledge about attenuation (typically Compton scatter) that gamma rays undergo is crucial to achieve quantitatively accurate PET reconstruction. To this end, PET reconstruction requires an attenuation correction of the raw PET data. In traditional PET reconstruction techniques, an attenuation map (or µ-map) is obtained by performing additional imaging acquisition via computed tomography (CT) system. CT systems are highly-accurate anatomical imaging modalities that provide ready attenuation information due to the use of x-ray attenuation as the mechanism for determining contrast. While attenuation correction using CT data is well established and highly effective, it carries the drawback of relying on an imaging modality that utilizes ionizing radiation to acquire data. The additional dose of ionizing radiation is undesirable. For example, when using CT imaging, the attenuation coefficients are measured with x-rays (with energies often in the neighborhood of 100 keV) and are remapped to estimate the attenuation coefficients for the 511 keV photons encountered in PET. Using CT for attenuation correction exposes patients to radiation, usually solely for creating the attenuation map or µ-map. Furthermore, acquiring the CT data requires an entirely separate imaging acquisition using a CT system abutted to the PET system. As such, image registration can be problematic.

In an attempt to overcome these problems with using CT data to perform attenuation correction, some have tried to use other imaging modalities that provide robust and accurate anatomical images, but without the need for the undesired ionizing radiation. Specifically, some have used magnetic resonance imaging (MRI) systems to acquire anatomical images of the patient to be examined using PET imaging. While MRI favorable foregoes use of any ionizing radiation, it does not carry with it the inherent attenuation information available in CT imaging data. As such, some have developed techniques to elicit attenuation information from MRI data or, more accurately, to create attenuation maps from the MRI data, e.g., through the creation of pseudo-CT images. For example, one approach for PET-MR attenuation correction is to segment a magnetic resonance image volume into different tissue classes and then assign the corresponding attenuation coefficients to the segmented tissue classes to create a µ-map. Thus, using MR for attenuation correction is complicated, as well as computationally intensive and relatively slow.

In a manner similar to CT-PET systems, some have manufactured MRI-PET systems that arrange the PET system about the bore of an MRI system. Of course, these combined systems are extremely expensive and result in an overall system that is not effective at operating as just one of the modalities (i.e., the MRI system in the MRI-PET system is limited relative to a stand-alone MRI system, and the CT system in the CT-PET system is limited relative to a stand-alone CT system).

Thus, despite the exceptional utility of PET as a clinical imaging modality for physiological studies, such as cancer localization, function, etc., it continues to be limited in clinical applicability due to these complexities. Therefore, there continues to be a need for an improved attenuation correction system and method for reconstructing PET data.

SUMMARY

The present disclosure overcomes the foregoing drawback by providing systems and methods for attenuation correction of PET data without requiring additional imaging data from a secondary imaging modality to perform attenuation correction of PET data. That is, the present disclosure facilitates performing attenuation correction of PET data using the PET data and without relying on complex physics models that are not adaptable and include assumptions and tradeoffs that can undermine attenuation correction of the PET data, not to mention become computational overwhelming and clinically infeasible.

In accordance with one aspect of the present disclosure, a method is provided for attenuation correction of positron emission tomography (PET) data. The method includes receiving at least one PET image of a subject created from PET data acquired from the subject, creating an attenuation correction map using the at least one PET image, and reconstructing PET data using the attenuation correction map and the at least one PET image to generate an attenuation corrected PET image.

In accordance with another aspect of the present disclosure, a method is provided for correcting positron emission tomography (PET) data for attenuation effects. The method includes receiving a first data set of raw PET data of a subject, generating at least one PET image from the first data set, and generating at least one pseudo-CT image from the at least one PET image. The method also includes performing an attenuation correction of the first data set using the at least one pseudo-CT image to generate a corrected first data set and generating a corrected PET image from the corrected first data set.

In accordance with yet another aspect of the present disclosure, a system is provided for generating positron emission tomography (PET) images of a subject. The system includes a data acquisition system configured to obtain raw PET data of a subject and a data processing system configured to receive the raw PET data from the data acquisition system, generate pseudo-CT data from the raw PET data, correct attenuation corresponding to the raw PET data using the pseudo-CT data, and generate at least one attenuation-corrected PET image of the subject.

The foregoing and other aspects of the invention will appear from the following description. In the description, reference is made to the accompanying drawings which form a part hereof, and in which there is shown by way of illustration a preferred aspect of the invention. Any particular aspect does not necessarily represent the full scope of the invention, however, and reference is made therefore to the claims and herein for interpreting the scope of the invention.

BRIEF DESCRIPTION OF THE DRAWINGS

The present disclosure will hereafter be described with reference to the accompanying drawings, wherein like reference numerals denote like elements.

DETAILED DESCRIPTION

Described herein are systems and methods for performing attenuation correction on positron emission tomography (PET) data using an attenuation correction map (μ-map) created from the PET data. As described herein, attenuation correction is generally used to adjust pixel intensity for coincidence events that are "lost" due to excessive scatter. On the other hand, scatter correction rejects measured coincidences whose lines of responses were altered due to Compton scattering, and are thus no longer spatially related to the annihilation event.

The present disclosure provides systems and methods for reconstructing PET data without the need for data from additional imaging modalities or physics models. In some aspects, attenuation correction may be performed using PET data. In some non-limiting examples, an attenuation correction map may be generated from a pseudo-CT image that is derived via one or more algorithms from the PET data. As used herein, the term "pseudo-CT" can be used to refer to data and/or images that has properties often attributed to CT images, such attenuation information, but are derived without the use of a CT imaging system. In some aspects, a deep learning framework may be trained from existing PET-CT data sets.

Before the systems and methods of the present disclosure are described in further detail, it is to be understood that the disclosure is not limited to the particular aspects described. It is also to be understood that the terminology used herein is for the purpose of describing particular aspects only, and is not intended to be limiting. The scope of the present invention will be limited only by the claims. As used herein, the singular forms "a", "an", and "the" include plural aspects unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Aspects referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Aspects of the present disclosure are explained in greater detail in the description that follows. Aspects of the disclosure that are described with respect to a method are applicable to aspects related to systems and other methods of the disclosure, unless the context clearly dictates otherwise. Similarly, aspects of the disclosure that are described with respect to a system are applicable to aspects related to methods and other systems of the disclosure, unless the context clearly dictates otherwise.

Figure 1:
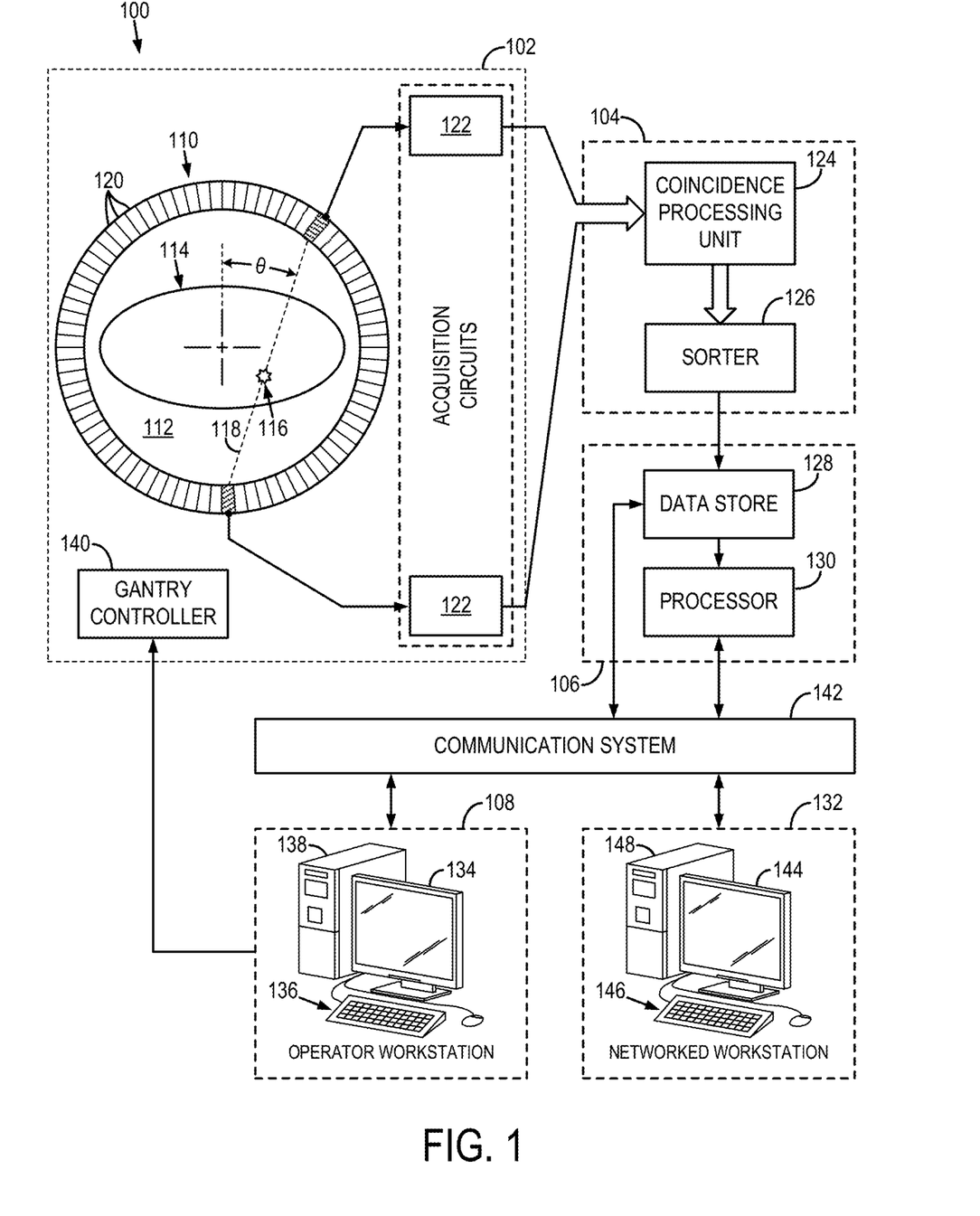
FIG. 1 is a block diagram of an example of a PET system that can be configured as a stand-alone PET system or as part of an integrated system, according to the present disclosure.

Referring now to FIG. 1, an example of a positron emission tomography ("PET") system 100 is illustrated. The PET system 100 generally includes an imaging hardware system 102, a data acquisition system 104, a data processing system 106, and an operator workstation 108. In some configurations, the PET system 100 corresponds to a stand-alone PET system; however, it will be appreciated by those skilled in the art that the PET system 100 can also be integrated in a combined imaging system, such as a combined PET and x-ray computed tomography ("CT") system, or a combined PET and magnetic resonance imaging ("MRI") system.

The imaging hardware system 102 generally includes a PET scanner having a radiation detector ring assembly 110 that is centered about the bore 112 of the PET scanner. The bore 112 of the PET scanner is sized to receive a subject 114 for examination. Prior to imaging, the subject 114 is administered a radioisotope, such as a radionuclide or radiotracer. Positrons are emitted by the radioisotope as it undergoes radioactive decay. These positrons travel a short distance before encountering electrons at which time the positron and electron annihilate. The positron-electron annihilation event 116 generates two photons that travel in opposite directions along a generally straight line 118.

The radiation detector ring assembly 110 is formed of multiple radiation detectors 120. By way of example, each radiation detector 120 may include one or more scintillators and one or more photodetectors. Examples of photodetectors that may be used in the radiation detectors 120 include photomultiplier tubes ("PMTs"), silicon photomultipliers ("SiPMs"), or avalanche photodiodes ("APDs"). The radiation detectors 120 are thus configured to produce a signal responsive to the photons generated by annihilation events 116. The signal responsive to the detection of a photon is communicated to a set of acquisition circuits 122. The acquisition circuits 122 receive the photon detection signals and produce signals that indicate the coordinates of each detected photon, the total energy associated with each detected photon, and the time at which each photon was detected. These data signals are sent the data acquisition system 104 where they are processed to identify detected photons that correspond to an annihilation event 116.

The data acquisition system 104 generally includes a coincidence processing unit 124 and a sorter 126. The coincidence processing unit 124 periodically samples the data signals produced by the acquisition circuits 122. The coincidence processing unit 124 assembles the information about each photon detection event into a set of numbers that indicate precisely when the event took place and the position in which the event was detected. This event data is then processed by the coincidence processing unit 124 to determine if any two detected photons correspond to a valid coincidence event.

The coincidence processing unit 124 determines if any two detected photons are in coincidence as follows. First, the times at which two photons were detected must be within a predetermined time window, for example, within 6-12 nanoseconds of each other. Second, the locations at which the two photons were detected must lie on a line 118 that passes through the field of view in the PET scanner bore 112. Each valid coincidence event represents the line 118 connecting the two radiation detectors 120 along which the annihilation event 116 occurred, which is referred to as a line-of-response ("LOR"). The data corresponding to each identified valid coincidence event is stored as coincidence data, which represents the near-simultaneous detection of photons generated by an annihilation event 116 and detected by a pair of radiation detectors 120.

The coincidence data is communicated to a sorter 126 where the coincidence events are grouped into projection images, which may be referred to as sinograms. The sorter 126 sorts each sinogram by the angle of each view, which may be measured as the angle, θ, of the line-of-response 118 from a reference direction that lies in the plane of the detector ring assembly 102. For three-dimensional images, the sorter 126 may also sort the sinograms by the tilt of each view. The sorter 126 may also process and sort additional data corresponding to detected photons, including the time at which the photons were detected and their respective energies.

After sorting, the sinograms are provided to the data processing system 106 for processing and image reconstruction. The data processing system 106 may include a data store 128 for storing the raw sinogram data. Before image reconstruction, the sinograms generally undergo preprocessing to correct the sinograms for random and scatter coincidence events, attenuation effects, and other sources of error. The stored sinogram data may thus be processed by a processor 130 located on the data processing system 106, by the operator workstation 108, or by a networked workstation 132.

The operator workstation 108 typically includes a display 134; one or more input devices 136, such as a keyboard and mouse; and a processor 138. The processor 138 may include a commercially available programmable machine running a commercially available operating system. The operator workstation 108 provides the operator interface that enables scan prescriptions to be entered into the PET system 100. In general, the operator workstation 108 may be in communication with a gantry controller 140 to control the positioning of the detector ring assembly 110 with respect to the subject 114 and may also be in communication with the data acquisition system 104 to control operation of the imaging hardware system 102 and data acquisition system 104 itself.

The operator workstation 108 may be connected to the data acquisition system 104 and data processing system 106 via a communication system 142, which may include any suitable network connection, whether wired, wireless, or a combination of both. As an example, the communication system 142 may include both proprietary or dedicated networks, as well as open networks, such as the internet.

The PET system 100 may also include one or more networked workstations 132. By way of example, a networked workstation 132 may include a display 144; one or more input devices 146, such as a keyboard and mouse; and a processor 148. The networked workstation 132 may be located within the same facility as the operator workstation 108, or in a different facility, such as a different healthcare institution or clinic. Like the operator workstation 108, the networked workstation 132 can be programmed to implement the methods and algorithms described here.

The networked workstation 132, whether within the same facility or in a different facility as the operator workstation 108, may gain remote access to the data processing system 106 or data store 128 via the communication system 142. Accordingly, multiple networked workstations 132 may have access to the data processing system 106 and the data store 128. In this manner, sinogram data, reconstructed images, or other data may exchanged between the data processing system 106 or the data store 128 and the networked workstations 132, such that the data or images may be remotely processed by a networked workstation 132. This data may be exchanged in any suitable format, such as in accordance with the transmission control protocol ("TCP"), the internet protocol ("IP"), or other known or suitable protocols.

As described above, PET reconstruction requires an attenuation correction of the raw PET data. In traditional PET scanners, an attenuation map (or μ-map) is obtained by performing additional imaging via CT (e.g., a PET-CT system) or via MR (e.g., a PET-MR system). However, PET-CT systems expose the patient to radiation to create the attenuation map, and PET-MR systems are computationally intensive and time consuming to use.

In addition to the radiation exposure, PET-CT systems estimate the attenuation map using a single snapshot in time, which does not reflect motion of a patient during a PET scan or between the PET and CT acquisitions.

In simultaneous PET/MR systems, an attenuation map is estimated based on MR images, which is particularly challenging because bone (the tissue with the largest attenuation coefficient) is not visible with positive contrast under typical MR acquisition. Consequently, bone is often ignored or estimated using atlas registration methods.

Attenuation correction is beneficial in producing clinically-useful PET images. Loss of counts due to attenuation increases image noise, image artifacts, and image distortion. Without attenuation correction, significant artifacts may occur on PET scans, including: prominent activity at body surface edges due to relative lack of attenuation at the surfaces compared to deeper structures, distorted appearance of areas of intense activity (e.g. urinary bladder) due to variable degrees of attenuation in different directions of activity originating from these areas, and diffuse, relatively increased activity in tissues of relatively low attenuation (e.g. lungs). Accordingly, attenuation correction of data is generally necessary for accurate qualitative and quantitative measurements of radiolabeled molecule activity.

Figure 2A:
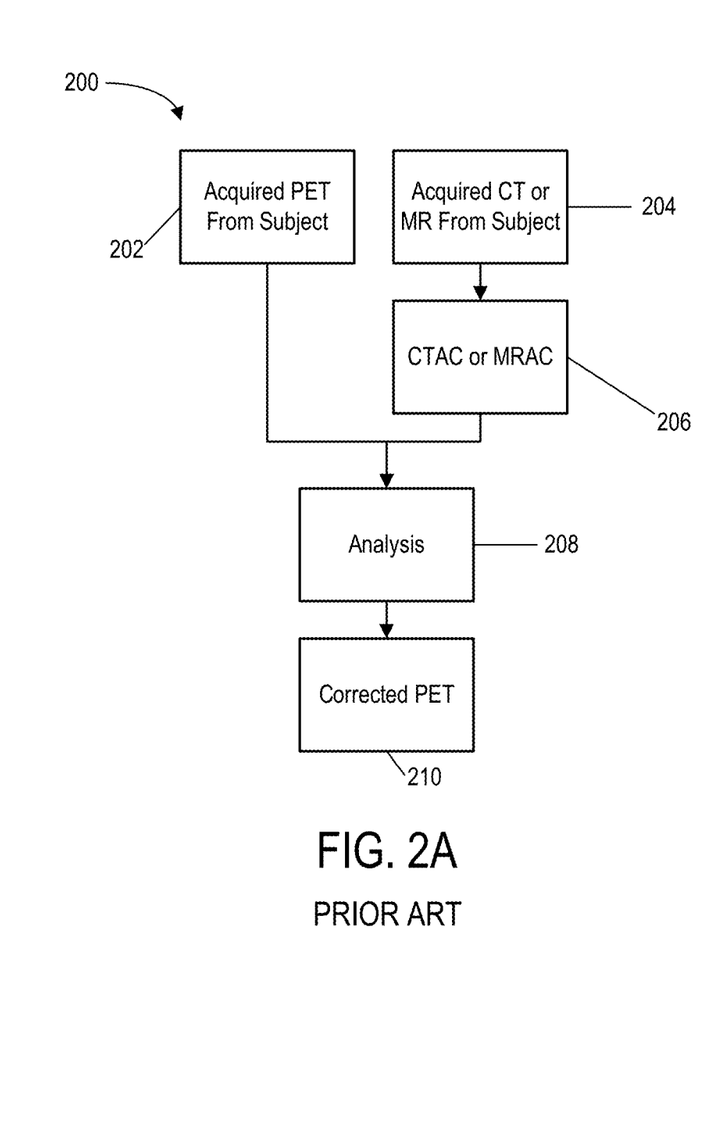
FIG. 2A is a block diagram of a conventional PET attenuation correction system and method.

Referring to FIG. 2A, a conventional method for attenuation correction of PET data is shown. Process 200 includes an input 202, and the input 202 is generally acquired PET data from a subject. A second input 204 includes acquired CT or MR data, from the same subject, and is then used for attenuation correction at process block 206. At process block 208, additional analysis may be done to correct the acquired PET data to produce an output 210. The output 210 of the process 200 corresponds to attenuation-corrected PET data. Accordingly, conventional systems and methods use CT or MR data to correct for attenuation in acquired PET data.

Figure 2B:
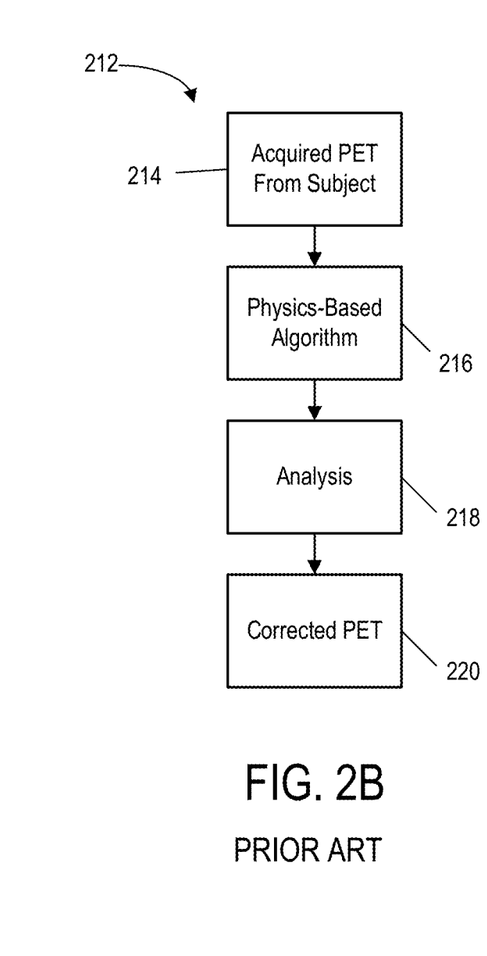
FIG. 2B is a block diagram of another conventional PET attenuation correction system and method.

Referring to FIG. 2B, another method for attenuation correction of PET data is shown. Process 212 includes an input 214, and the input is generally acquired PET data from a subject. The acquired PET data is then used in a physics-based algorithm at process block 216. The physics-based algorithm may be based on MR or other data, and is used to estimate an attenuation map. At process block 218, additional analysis may be done to correct the acquired PET data based on the estimated attenuation map. At process block 220, an output corresponds to attenuation-corrected PET data. The use of physics-based algorithms to create the attenuation map introduces assumptions and estimations that may lead to increased error in the corrected PET data. Specifically, assumptions regarding the non-movement of subjects during the acquiring of PET data and what constraints can be deemed "constant" may introduce error into the attenuation-corrected PET data. As will be described, the systems and methods of the present disclosure are superior for a variety of reasons, including that do not rely on data from other imaging modalities and do not require man-made physics models that are built upon assumptions that are not adaptable and may include errors or be ill fit to a given situation.

Figure 3:
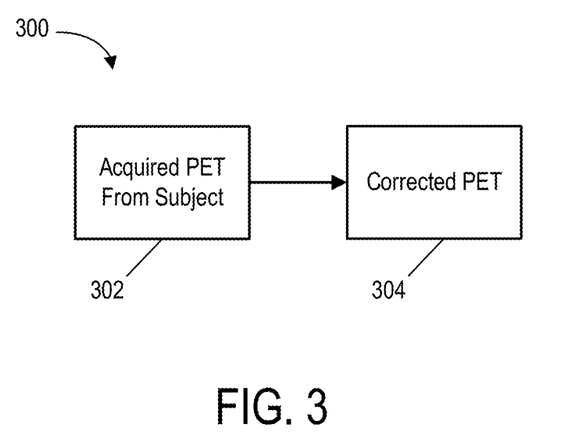
FIG. 3 is a block diagram of a PET attenuation correction system and method, according to the present disclosure.

FIG. 3 is a process 300 for correcting PET data without additional imaging of the subject, such as with MR or CT imaging. In this non-limiting implementation, one input 302 may be used to produce an output 304. The input 302 may include raw PET data, and the output 304 may include attenuation corrected PET data and no man-made physics model is used to generate the output 304. Rather, in some situations, data-driven correction may be used to alter the raw PET data to correct for attenuation. Further, deep-learning or machine-learning algorithms may be used to transform the acquired raw PET data to attenuation corrected PET data.

Figure 4:
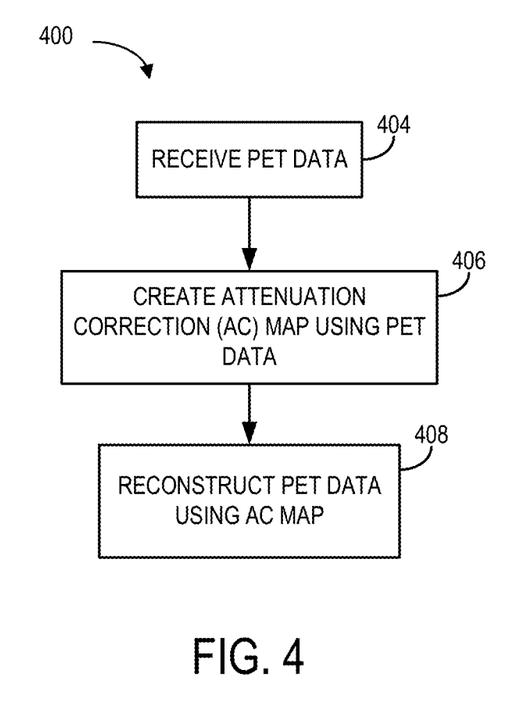
FIG. 4 is a flowchart illustrating an example method of correcting PET data, according to the present disclosure.

Referring to FIG. 4, a method 400 is shown. The method 400 may be used to correct attenuation of PET data to produce meaningful PET data and images. At process block 404, PET data may be received. In some situations, the PET data may be raw PET data. In some non-limiting configurations, the PET data may be received from an imaging system, such as FIG. 1 as previously described. In some situations, it may be beneficial to modify the PET data prior to processing for attenuation correction. Specifically, it may be beneficial to segment PET data and/or generate PET images from the raw PET data. In some non-limiting configurations, the raw PET data may not be modified prior to attenuation correction.

At process block 406, an attenuation correction (AC) map may be created, using the modified PET data. The AC map may be created directly from the modified PET data. In some situations, the AC map may be created using the modified PET data and a reference data set. The reference data set may not be from the same subject that the PET data was acquired from. In some situations however, existing reference data from the same subject may be used (e.g., from previous imaging). Next, at process block 408, the PET data may be reconstructed using the AC map. The PET data may include a PET image.

Figure 5:
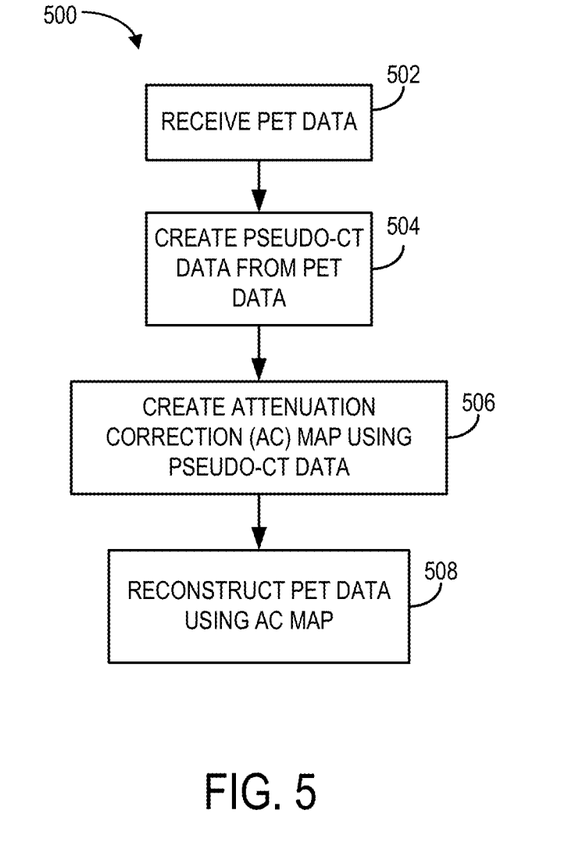
FIG. 5 is a flowchart illustrating another example method of correcting PET data, according to the present disclosure.

Referring to FIG. 5, a method 500 is shown. The method 500 may be used to correct attenuation of PET data to produce meaningful PET data and images. At process block 502, PET data may be received. In some situations, the data may be raw PET data. In some non-limiting configurations, the PET data may be received from an imaging system, such as FIG. 1 as previously described.

At process block 504, the PET data may be used to create pseudo-CT data. The pseudo-CT data may be created using a combination of the received PET data and reference CT data or CT images. At process block 506, an attenuation correction (AC) map may be created using the pseudo-CT data. Next, at process block 508, the PET data may be reconstructed using the AC map. The PET data may include a PET image.

Figure 6:
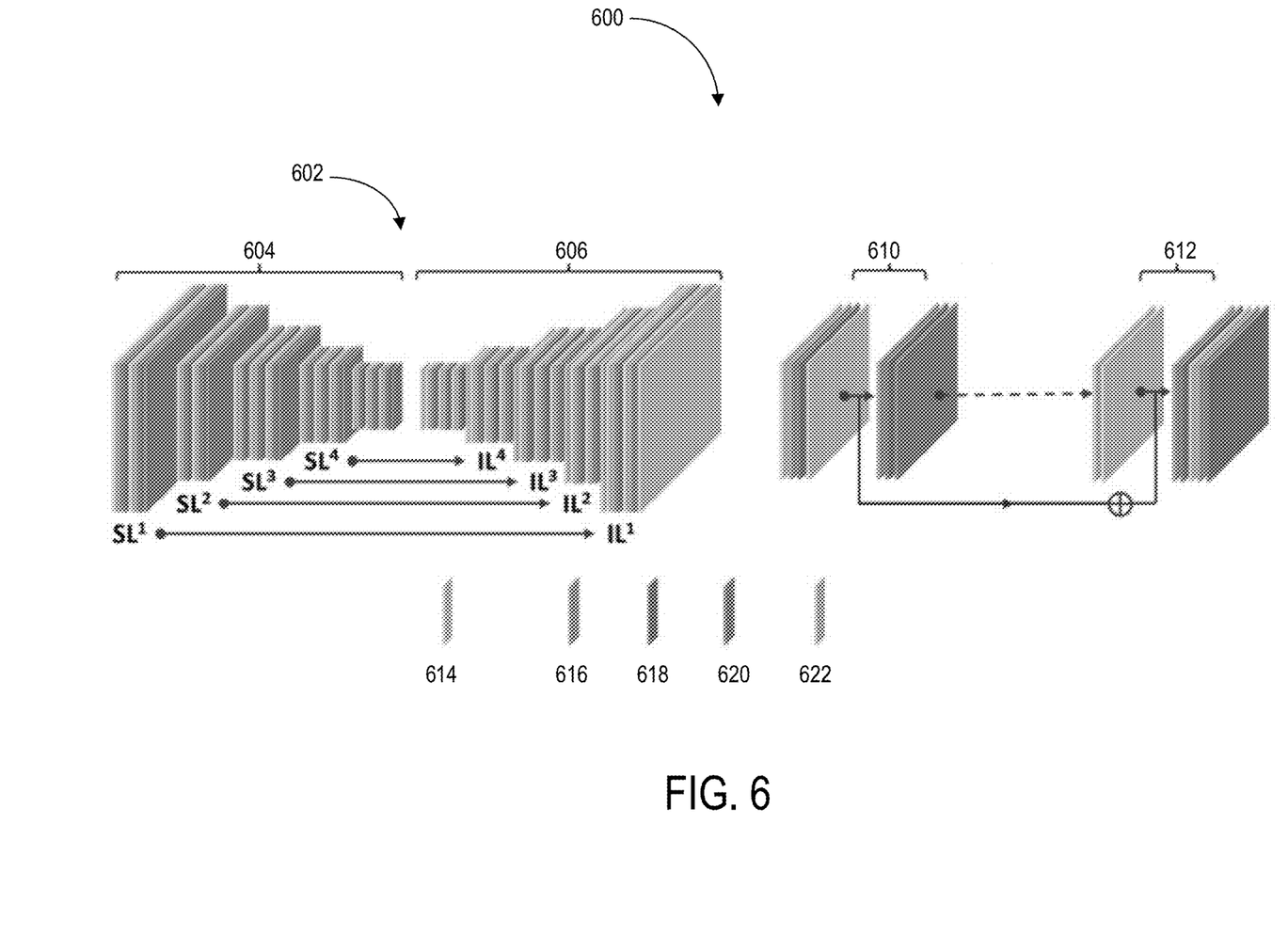
FIG. 6 is a diagram of an example machine-learning system, according to the present disclosure.

Now referring to FIG. 6, a diagram of an example machine-learning system is shown. A machine learning system 600 may be used to generate pseudo-CT data using reference CT images and PET images. The machine learning system 600 may include a deep convolutional auto-encoder (CAE) or convolutional encoder-decoder (CED) network 602. The CED network 602 may include an encoder network 604 and a decoder network 606. The encoder network 604 may include a start layer (SL) 610. Each SL 610 may correspond to an insert layer (IL) 612 within the decoder network 606.

Still referring to FIG. 6, the SL 610 and the IL 612 may include a convolution layer 614, a batch normalization (BN) layer 616, a rectified-linear unit (ReLU) activation layer 618, a pooling layer 620, and/or an upsampling layer 622.

The deep convolutional encoder-decoder (CED) network 602, may be configured to map a non-attenuation corrected (NAC) PET image into a pixel-wise continuously valued CT image. The encoder network 604 may be designed to compress input image data while detecting robust and spatially invariant features. As one non-limiting example, the encoder network 604 may be a VGG16 network, as described by Simonyan K, Zisserman A. (Simonyan K, Zisserman A. Very Deep Convolutional Networks for Large-Scale Image Recognition. arXiv Prepr. 2014; 1-10). In particular, the VGG16 network has been proven to be efficient in capturing image features in object recognition, and to be effective in CED based medical image applications.

Each unit layer of the encoder network 604 may include a 2D convolution layer 614 with a set of 2D filters, batch normalization (BN) layer 616, rectified-linear unit (ReLU) activation layer 618, followed by a max-pooling layer (the pooling layer 620) for reduction of data dimensions. The unit layer may be repeated multiple times to achieve sufficient data compression.

To reconstruct pixelwise continuously-valued CT images, the decoder network 606 may be applied directly after the encoder network 604. This decoder network 606 may be the reverse process of the encoder network 604, and may include "mirrored" layers from the encoder network 604. Specifically, the pooling layer 620 in the decoder network 606 may be replaced by an un-pooling layer (i.e., upsampling) where the image features may be upsampled using a bilinear interpolation method. At the end of the decoder network 606, an additional 2D convolutional layer 614 with one 2D filter may be added to synthesize output pseudo-CT images based on the decoded image features from the upstream decoder network 606.

According to the present disclosure, the CED network 602 may also feature shortcut connections (SC) which may be used to forwardly pass image features from the encoder network 604 to the decoder network 606. Notably, synthesis of continuously valued CT images may benefit from preservation of richer image features, for which the added shortcut connection may valuable in maintaining. As shown in FIG. 6, the shortcut connections may occur symmetrically in multiple layers in the networks and link feature maps by adding ones from the encoder network 604 to the ones in the decoder network 606 element-wise. As shown, for example, a total of 4 shortcut connections may be created between the network layers and one additional shortcut connection may also be generated from input image directly to output image. For each shortcut connection, the insertion of the layer may follow the strategy described by He K, Zhang X, Ren S, Sun J. (He K, Zhang X, Ren S, Sun J. Identity Mappings in Deep Residual Networks. 2016).

Figure 7:
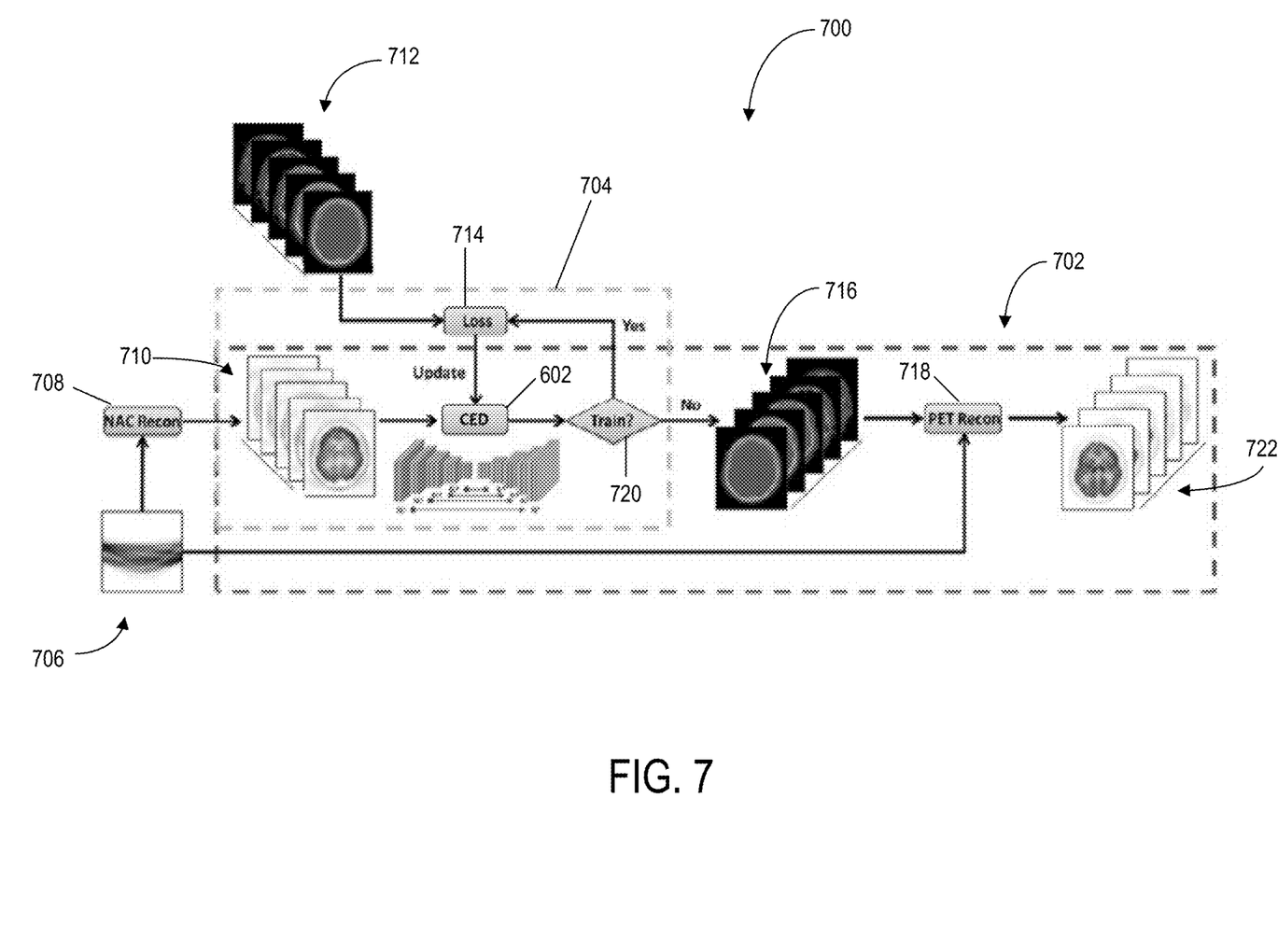
FIG. 7 is a block diagram of an example PET attenuation correction system and method, according to the present disclosure.

The CED network 602 may be used within a deep attenuation correction system 700, as shown, for example, in FIG. 7. The deep attenuation correction system 700 may include a training phase 704 and a reconstruction phase 702. Some aspects of the training phase 704 and the reconstruction phase 702 may be similar.

Regarding the training phase 704, raw PET data 706 may be used as an input to process block 708. Process block 708 may be configured to reconstruct a PET image 710 without attenuation correction (i.e. non-attenuation corrected (NAC) PET images). The PET image 710 may then be used as an input to the CED network 602. The CED network 602 may function as described with respect to FIG. 6.

A second input may be used for the training phase 704. Reference CT images 712 may be used as an input to process block 714. The reference CT images 712 may come from a database of CT images. Process block 714 may provide an input to the CED network 602. The CED network 602 may iteratively estimate and output continuous CT images, and compare them to the reference CT images 712. The data consistency between each estimated and reference CT image 712 may be ensured by using Mean Squared Error (MSE) as an image loss objective function where the loss may be calculated in a mini-batch images in each iteration (at process block 714).

Still referring to the deep attenuation correction system 700, the output of the CED network 602 may be input into decision block 720. If still within the training phase 704, the CED output may be compared to the reference CT images 712, at process block 714. If the training phase 704 is complete, the CED output may be used as a pseudo-CT image 716.

Referring to the reconstruction phase 702, the raw PET data 706 may be used as a direct input to process block 718. The generated pseudo-CT image 716 may be used as a second input to process block 718. At process block 718, the pseudo-CT image 716 may be used to reconstruct PET data, via an AC map. The raw PET data 706 may be mapped using the pseudo-CT image 716. Subsequently, process block 718 may output reconstructed PET data that has undergone attenuation correction. The reconstruction phase 702 may therefore output an attenuation corrected (AC) PET image 722, using just PET data from the imaged subject.

The present disclosure includes systems and methods for producing attenuation corrected PET images. In some configurations, the corrected PET images may be obtained in less than one minute. The speed of producing the corrected images may be very beneficial in clinical settings. The present disclosure may produce quantitative PET imaging without any application of CT, which may have a substantial impact on CT dose reduction and resilience to patient motion in PET studies.

In some configurations, the present disclosure may be implemented in software and may be applied to existing systems. In addition, it may result in significantly less expensive equipment (e.g., a PET-only system).

Overall, the present disclosure may improve the accuracy of PET, PET/CT and PET/MR as well as have potential applications for treatment planning for radiation therapy.

Experiments

In one non-limiting example, two independent phases for training retrospective data and reconstructing new data were implemented. In the training phase, the training data for the CED network included NAC PET images as inputs, as well as reference non-contrast enhanced CT data.

For each training dataset, NAC PET and co-registered CT images were scaled by pixel intensity of 6000 (Bq/ml) and 2000 (HU), respectively, which were determined empirically and used for all data.

3D NAC PET and CT images were cropped to enclose the image object and remove redundant background prior to deep learning training. 2D axial slices from the 3D volumetric NAC and CT images were used as inputs to the deep learning network.

All 2D input images were first transformed pixel-wise using a Softsign activation function and then resampled to a matrix of size 200×180 using bilinear interpolation before being used as input to the CED. The encoder and decoder network weights were initialized using an initialization scheme described by He K, Zhang X, Ren S, Sun J. (He K, Zhang X, Ren S, Sun J. Delving Deep into Rectifiers: Surpassing Human-Level Performance on ImageNet Classification. ArXiv e-prints. 2015.) and updated using an gradient-based optimization algorithm based on adaptive estimates of lower-order moments with a fixed learning rate of 0.001.

The CED network iteratively estimated outputs of continuous CT images, and compared them to the reference CT data (i.e. real CT data). The data consistency between estimated and real CT image was ensured by using Mean Squared Error (MSE) as an image loss objective function where the loss was calculated in a mini-batch of 12 images in each iteration.

Once the training phase was complete, the CED network at the epoch with least image loss was fixed and was used for generating continuous pseudo-CT for new PET data, which were subsequently used for PET reconstruction.

In this non-limiting example, the CED network was coded with Tensorflow deep learning libraries, as discussed by Abadi M, Agarwal A, Barham P, et al. (Abadi M, Agarwal A, Barham P, et al. TensorFlow: Large-Scale Machine Learning on Heterogeneous Distributed Systems. 2016).

Results

Figure 8A:
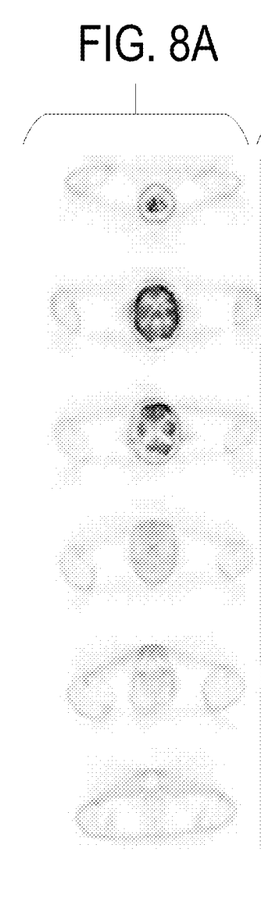
FIG. 8A is a set of example PET images without attenuation correction.
Figure 8B:
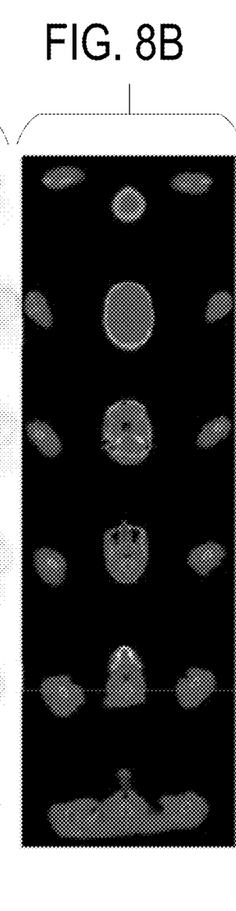
FIG. 8B is a set of example real CT images.
Figure 8C:
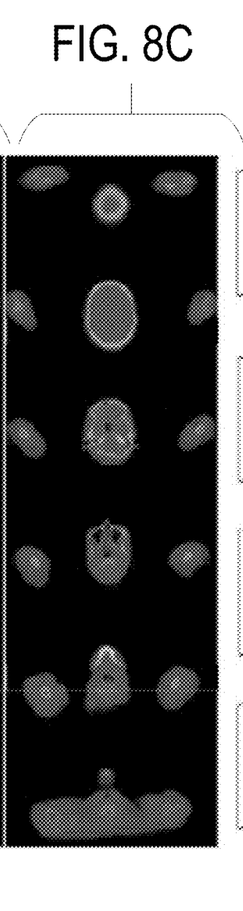
FIG. 8C is a set of example pseudo-CT images, according to the present disclosure.

Several non-limiting examples of acquired NAC PET images, real CT images, and deepAC pseudo CT images for a subject are shown in FIGS. 8A through 8G. Referring to FIG. 8A, several NAC PET images are shown. FIG. 8B shows several real CT images and FIG. 8C shows several pseudo-CT images, according to the present disclosure.

Figure 8D:
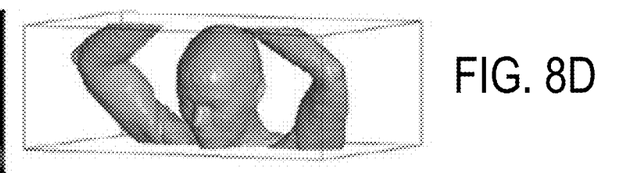
FIG. 8D is an example PET surface image with traditional CT-based attenuation correction (using real CT images).

Referring to FIG. 8D, a surface image is shown that was generated using the NAC PET images from FIG. 8A, and corrected for attenuation using the real CT images from FIG. 8B.

Figure 8E:
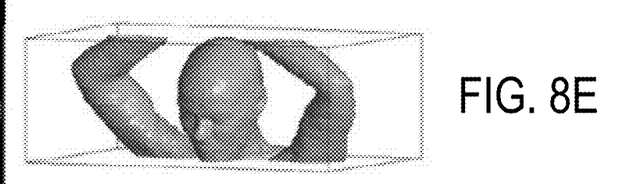
FIG. 8E is an example PET surface image with deep-learning attenuation correction, according to the present disclosure (using pseudo-CT images).

In comparison, FIG. 8E shows a surface image that was generated using the NAC PET images from FIG. 8A, and corrected for attenuation using the pseudo-CT images from FIG. 8C, according to the present disclosure. It may be appreciated that the surface images of FIG. 8D and FIG. 8E are substantially similar, however the resulting surface image of FIG. 8E (using the pseudo-CT images) was created without additional imaging (i.e. CT imaging) of the subject.

Figure 8F:
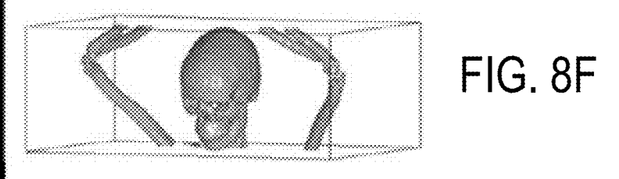
FIG. 8F is an example PET bone image with traditional CT-based attenuation correction (using real CT images).

Referring to FIG. 8F, a bone image is shown that was generated using the NAC PET images from FIG. 8A, and corrected for attenuation using the real CT images from FIG. 8B.

Figure 8G:
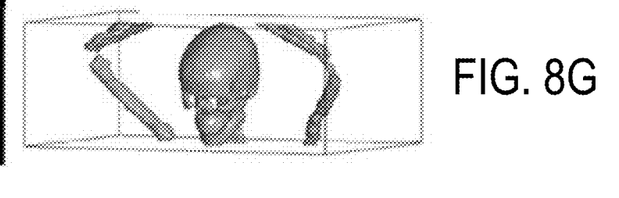
FIG. 8G is an example PET bone image with deep-learning attenuation correction, according to the present disclosure (using pseudo-CT images).

In comparison, FIG. 8G shows a bone image that was generated using the NAC PET images from FIG. 8A, and corrected for attenuation using the pseudo-CT images from FIG. 8C, according to the present disclosure. Notably, the bone images of FIG. 8F and FIG. 8G are substantially similar. As previously indicated, however, the resulting bone image of FIG. 8G (using the pseudo-CT images) was created without additional imaging (i.e. CT imaging) of the subject.

Still referring to FIGS. 8A through 8G, the total training phase took approximately 23 hours, whereas generating a single pseudo-CT image using the trained model took approximately 0.5 minutes. It may be appreciated that the generation of the pseudo-CT image was substantially less than the time required to obtain real CT images from the subject. As shown, the deep attenuation correction system was able to identify air, skull, and soft tissue in the NAC PET images and synthesize continuous CT values for distinct tissue types.

Figure 9A:
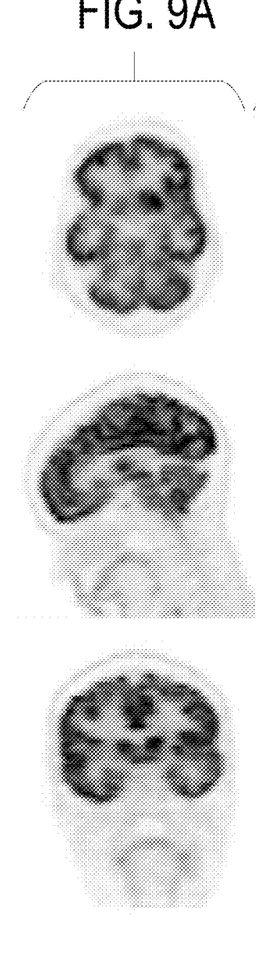
FIG. 9A is a set of example PET images with traditional CT-based attenuation correction (using real CT images).
Figure 9B:
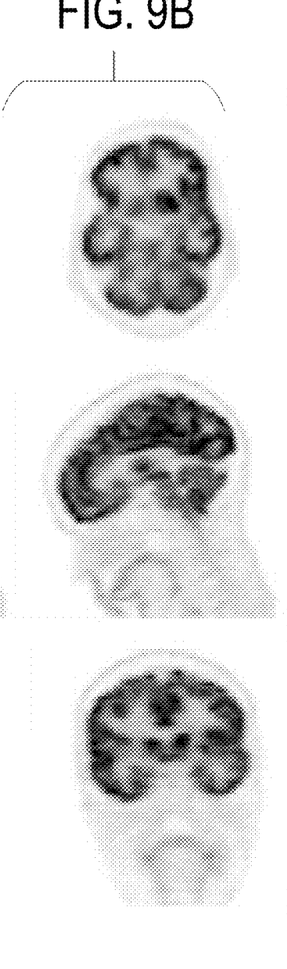
FIG. 9B is a set of example PET images with deep-learning attenuation correction, according to the present disclosure (using pseudo-CT images).
Figure 9C:
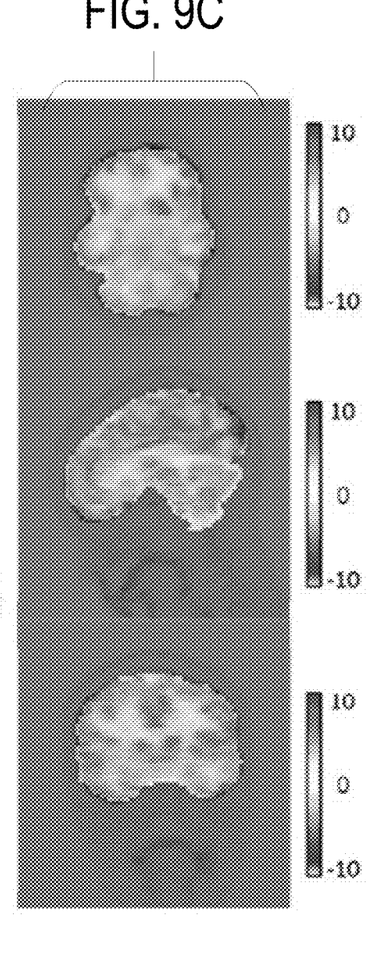
FIG. 9C is a set of example images showing percent-error of the images of FIG. 9B compared to the images of FIG. 9A, according to the present disclosure.

Referring to FIGS. 9A through 9C, output PET images were compared to determine percent error. FIG. 9A shows resulting PET reconstructed images that were corrected for attenuation using real CT images from the subject. In contrast, FIG. 9B shows resulting PET reconstructed images that were corrected for attenuation using pseudo-CT images, according to the present disclosure. FIG. 9C provides images illustrating the pixel-wise PET error percentage when comparing the images of FIG. 9B to the images of FIG. 9A. As shown, the PET images reconstructed via pseudo-CT images result in PET error of less than 1% in most of the subject's brain regions.

Figure 10:
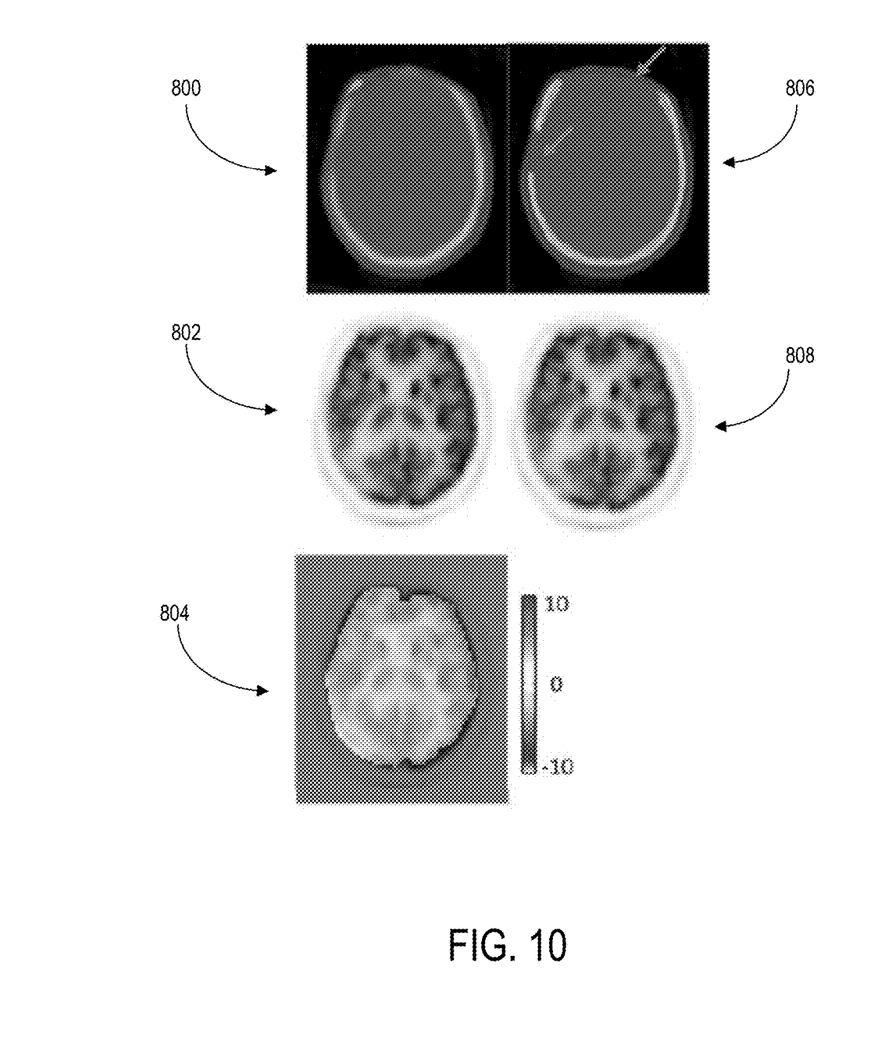
FIG. 10 is a set of example images comparing PET reconstruction with traditional CT-based attenuation correction and PET reconstruction with deep-learning attenuation correction, according to the present disclosure.

Referring to FIG. 10, images are shown to a subject having significant right and frontal skull abnormality. Image 800 shows a pseudo-CT image, according to the present disclosure. Image 802 shows a reconstructed PET image, using the image 800 for attenuation correction. In contrast, image 806 shows a real CT image from the subject, and image 808 shows a reconstructed PET image using the image 806 for attenuation correction.

Still referring to FIG. 10, image 804 shows the PET error percentage when comparing image 802 to image 808. The average reconstructed PET error for the subject is 1.51%. Notably, the generated pseudo-CT was able to predict parts of missing skull in the forehead which were apparent in the real CT image (indicated by arrows). Accordingly, despite significant skull abnormalities relative to typical subjects, PET reconstruction error was maintained at low level utilizing the methods of the present disclosure.

As described, the systems and methods of the present disclosure can be utilized to perform attenuation correction. However, the μ-maps or other means for performing corrections described herein can be used for additional corrections beyond attenuation corrections.

The foregoing merely illustrates the principles of the disclosure. Various modifications and alterations to the described aspects will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. Further, the exemplary aspects described herein can operate together with one another and interchangeably therewith. In addition, to the extent that the prior art knowledge has not been explicitly incorporated by reference herein above, it is explicitly being incorporated herein in its entirety. All publications referenced herein above are incorporated herein by reference in their entireties.

We claim:

1. A method for correcting positron emission tomography (PET) data for attenuation effects, the method comprising the steps:
    (a) receiving at least one PET image of a subject created from PET data acquired from the subject;
    (b) creating an attenuation correction map using the at least one PET image and a reference data set, wherein the reference data set includes data from at least a second subject using another imaging modality and wherein the reference data set does not include imaging data acquired from the subject; and
    (c) reconstructing PET data using the attenuation correction map and the at least one PET image to generate an attenuation corrected PET image.

2. The method of claim 1, wherein creating the attenuation correction map includes generating pseudo-CT data.

3. The method of claim 2, further comprising generating the pseudo-CT data using the reference data set.

4. The method of claim 3, wherein the reference data set includes CT data from at least a second subject.

5. The method of claim 4, wherein the reference data set includes CT data from a database of subjects.

6. The method of claim 3, further comprising comparing the pseudo-CT data to the reference data set and calculating a loss value of the pseudo-CT data.

7. The method of claim 1, wherein steps (a) and (b) occur in less than 1 minute.

8. The method of claim 1, wherein steps (a) and (b) occur in 30 seconds or less.

9. A method for correcting positron emission tomography (PET) data for attenuation effects, the method including steps comprising:
  (a) receiving a first data set of raw PET data of a subject;
  (b) generating at least one PET image from the first data set;
  (c) generating at least one pseudo-CT image from the at least one PET image, wherein the at least one pseudo-CT image is generated without imaging data acquired from the subject, and wherein the at least one pseudo-CT image is generated using data from another imaging modality;
  (d) performing an attenuation correction of the first data set using the at least one pseudo-CT image to generate a corrected first data set; and
  (e) generating a corrected PET image from the corrected first data set.

10. The method of claim 9, wherein step (c) includes applying the at least one PET image to a machine-learning module to generate the at least one pseudo-CT image, the machine-learning module comprising a processor.

11. The method of claim 9, wherein step (c) further comprises:
  (i) receiving reference CT data;
  (ii) generating a pseudo-CT image from the at least one PET image;
  (iii) comparing the pseudo-CT image to the reference CT data and determining a loss value;
  (iv) determining if the loss value is within a predetermined range; and
  (v) repeating steps (ii)-(iv) until the loss value is within the predetermined range.

12. The method of claim 11, wherein the reference CT data does not correspond to the subject.

13. The method of claim 11, wherein step (c) is performed in less than 24 hours.

14. The method of claim 9, wherein step (d) further comprises creating an attenuation correction map using the first data set and the at least one pseudo-CT image.

15. The method of claim 9, wherein step (c) is performed in less than 1 minute.

16. A system for generating (PET) data, the system comprising:
  a data acquisition system comprising a processor and configured to obtain raw PET data of a subject; and
  a data processing system comprising a processor and configured to:
    receive the raw PET data from the data acquisition system;
    generate pseudo-CT data from the raw PET data, wherein the at least one pseudo-CT image is generated without imaging data acquired from the subject, and wherein the at least one pseudo-CT image is generated using data from another imaging modality;
    correct attenuation corresponding to the raw PET data using the pseudo-CT data; and
    generate at least one attenuation-corrected PET image of the subject.

17. The system of claim 16, further comprising a machine-learning module comprising a processor and configured to generate the pseudo-CT data.

18. The system of claim 16, further comprising a machine-learning module comprising a processor and configured to generate the pseudo-CT data by performing steps comprising:
  (i) generating a pseudo-CT image from the raw PET data;
  (ii) comparing the pseudo-CT image to reference data and determining a loss value;
  (iii) determining if the loss value is within a predetermined range; and
  (iv) repeating steps (i)-(iii) until the loss value is within the predetermined range.

19. The system of claim 18, wherein the reference data is accessed from a database and corresponds to CT data from a plurality of subjects.

20. The system of claim 18, wherein steps (i)-(iv) are performed in less than 24 hours.

* * * * *